US006985279B1

(12) United States Patent
Fu

(10) Patent No.: US 6,985,279 B1
(45) Date of Patent: Jan. 10, 2006

(54) MEMS MIRROR WITH DRIVE ROTATION AMPLIFICATION OF MIRROR ROTATION ANGLE

(75) Inventor: Yee-Chung Fu, Fremont, CA (US)

(73) Assignee: Advanced Nano Systems, Inc., San Jose, CA (US)

( * ) Notice: Subject to any disclaimer, the term of this patent is extended or adjusted under 35 U.S.C. 154(b) by 0 days.

(21) Appl. No.: 10/910,384

(22) Filed: Aug. 2, 2004

(51) Int. Cl.
 *G02B 7/182* (2006.01)
(52) U.S. Cl. .................. 359/291; 359/290; 359/224; 359/225; 359/871; 359/872
(58) Field of Classification Search ................ 359/290, 359/291, 292, 293, 294, 295, 223, 224, 225, 359/226, 871, 872
See application file for complete search history.

(56) References Cited

U.S. PATENT DOCUMENTS 6,817,725 B2 * 11/2004 Mizuno et al. ............. 359/877

* cited by examiner

*Primary Examiner*—Timothy Thompson
(74) *Attorney, Agent, or Firm*—Patent Law Group LLP; David C. Hsia

(57) ABSTRACT

A micro-electro-mechanical system (MEMS) mirror device includes a mirror coupled to a rotating frame by a first torsional hinge along a rotational axis. The rotating frame has a body that defines a frame opening, and a group of rotational teeth extending from the body. A first bonding pad is located in the frame opening and coupled to the rotating frame by a second torsional hinge along the rotational axis. A second bonding pad is coupled to the rotating frame by a third torsional hinge along the rotational axis.

19 Claims, 4 Drawing Sheets

MEMS MIRROR WITH DRIVE ROTATION AMPLIFICATION OF MIRROR ROTATION ANGLE

FIELD OF INVENTION

This invention relates to micro-electro-mechanical system (MEMS) devices, and more particularly to MEMS scanning mirrors.

DESCRIPTION OF RELATED ART

Various electrostatic comb actuator designs for MEMS scanning mirrors have been proposed. The extensive applications of these devices include barcode readers, laser printers, confocal microscopes, projection displays, rear projection TVs, and wearable displays (e.g., micro displays). For these applications, the MEMS scanning mirrors typically need to have a great range of rotation. Thus, what is needed is a MEMS scanning mirror that has a great range of rotation.

SUMMARY

In one embodiment of the invention, a micro-electro-mechanical system (MEMS) mirror device includes a mirror coupled to a rotating frame by a first torsional hinge along a rotational axis. The rotating frame has a body that defines a frame opening, and a group of rotational teeth extending from the frame body. A first bonding pad is located in the frame opening and coupled to the rotating frame by a second torsional hinge along the rotational axis. A second bonding pad is coupled to the rotating frame by a third torsional hinge along the rotational axis.

BRIEF DESCRIPTION OF THE DRAWINGS

Use of the same reference numbers in different figures indicates similar or identical elements.

DETAILED DESCRIPTION OF THE INVENTION

Figure 1A:
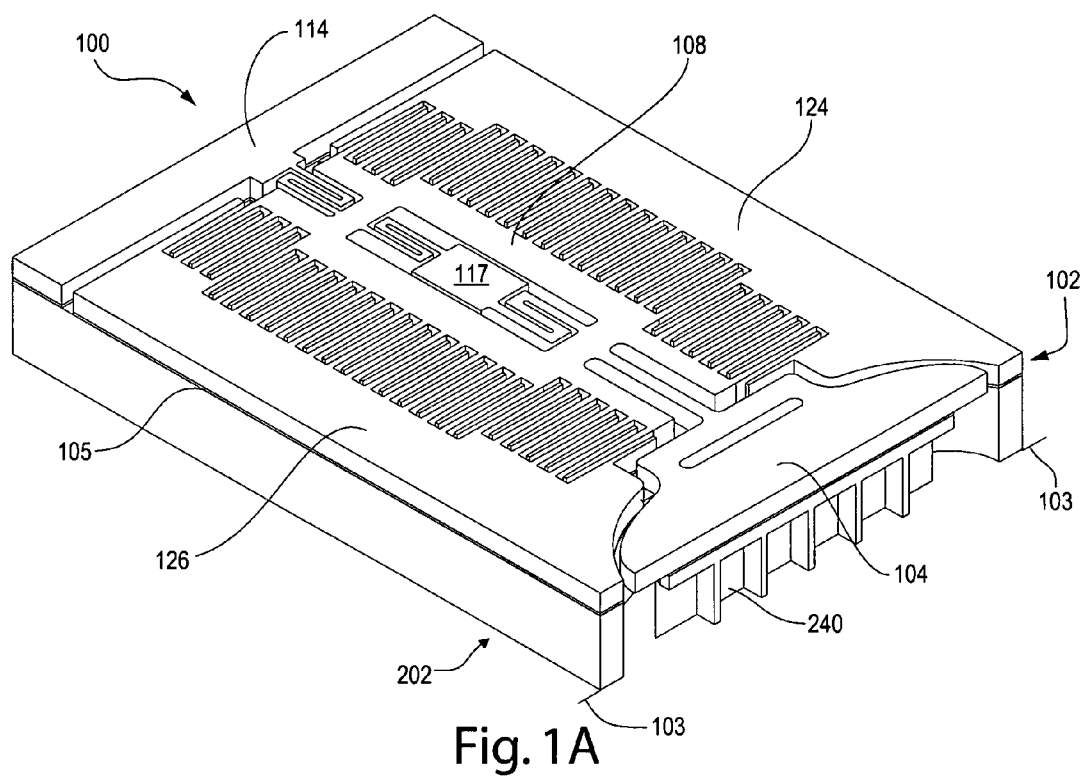
FIG. 1A illustrates a perspective cut-away view of a MEMS mirror device in one embodiment of the invention.
Figure 1B:
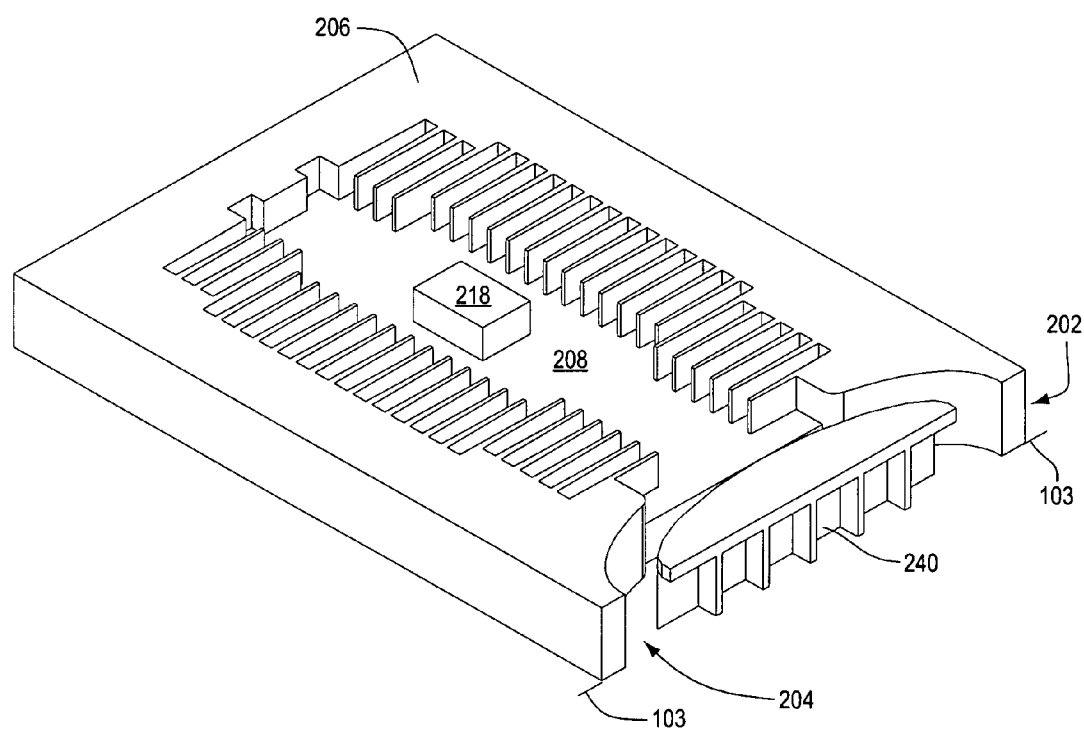
FIG. 1B illustrates a perspective cut-away view of a lower layer in the MEMS mirror device of FIG. 1A in one embodiment of the invention.

FIG. 1A partially illustrates a MEMS mirror device 100 along a vertical line of symmetry 103 in one embodiment of the invention. Device 100 includes an upper layer 102 bonded to but electrically insulated from a lower layer 202 (shown more clearly in FIG. 1B) by an insulation layer 105. Components on upper layer 102 and lower layer 202 can be formed from semiconductor wafers using semiconductor processing techniques.

Figure 2:
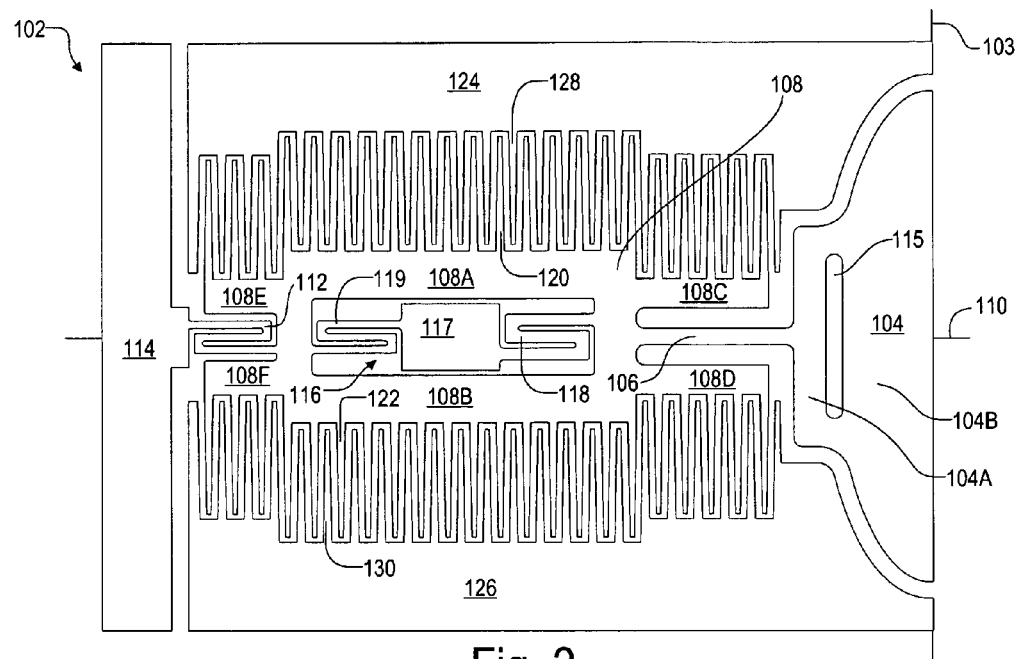
FIGS. 2 and 3 illustrate partial top views of the layers in the MEMS mirror device of FIG. 1A along a vertical line of symmetry in one embodiment of the invention.

Referring to FIG. 2, upper layer 102 includes a mirror 104 connected by a torsional hinge 106 to a first end of a rotating frame 108 along a rotational axis 110. A second end of rotating frame 108 is connected by a torsional hinge 112 to a bonding pad 114 along rotational axis 110.

In one embodiment, mirror 104 defines a slot 115 that divides itself into a tab portion 104A that is connected to a reflector portion 104B above and below slot 115. In this embodiment, torsional hinge 106 is connected between tab portion 104A and rotating frame 108.

Rotating frame 108 is a beam-like structure having a body that defines one or more frame openings 116 (only one is illustrated for clarity). Each frame opening 116 accommodates a bonding pad 117. Opposing sides of each bonding pad 117 are connected by torsional hinges 118 and 119 to rotating frame 108 along rotational axis 110.

Rotating frame 108 has two opposing sides 108A and 108B relative to rotational axis 110. Rotational comb teeth 120 (only one is labeled for clarity) extend from side 108A while rotational comb teeth 122 (only one is labeled for clarity) extend from side 108B.

Rotating frame 108 also has beams 108C and 108D protruding from one end of rotating frame 108 to sandwich torsional spring 106. Rotational comb teeth 120 extend from beam 108C while rotational comb teeth 122 extend from beam 108D. Similarly, rotating frame 108 has beams 108E and 108F protruding from the other end of rotating frame 108 to sandwich torsional spring 112. Rotational comb teeth 120 extend from beam 108E while rotational comb teeth 122 extend from beam 108F. Note that sides 108A and 108B may extend further outward than beams 108C, 108D, 108E, and 108F to provide room to form bonding pads (e.g., bonding pad 117) within rotating frame 108 that would properly mount to anchoring pads (e.g., anchoring pad 218) below.

Bonding pads 124 and 126 are formed on opposing sides of rotating frame 108. Stationary comb teeth 128 (only one is labeled for clarity) extend from bonding pad 124 toward rotating frame 108 while stationary comb teeth 130 (only one is labeled for clarity) extend from bonding pad 126 toward rotating frame 108. When rotation frame 108 is level (as shown), stationary comb teeth 128 and rotational comb teeth 120 are interdigitated while stationary comb teeth 130 and rotational comb teeth 122 are interdigitated. To match rotational comb teeth 120, stationary comb teeth 128 are staggered with two side sections that extend closer to rotational axis 110 than a middle section. Stationary comb teeth 130 are also be staggered to match rotational comb teeth 122.

In one embodiment, the components of upper layer 102 are formed by etching a semiconductor wafer.

Figure 3:
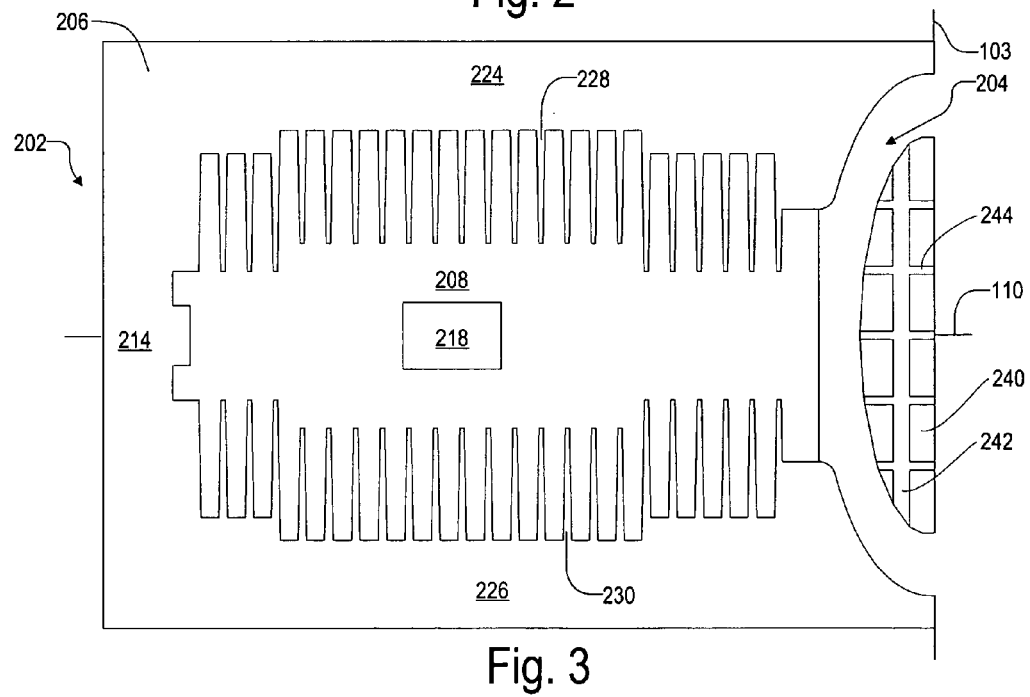

Referring to FIG. 3, lower layer 202 includes an anchoring pad 218 onto which bonding pad 117 (FIG. 2) is mounted. Lower layer 202 further includes an anchoring pad 206 having a horizontal sections 224 onto which bonding pad 124 (FIG. 2) is mounted, a horizontal section 226 onto which bonding pad 126 (FIG. 2) is mounted, and a vertical section 214 onto which bonding pad 114 is mounted.

Figure 4:
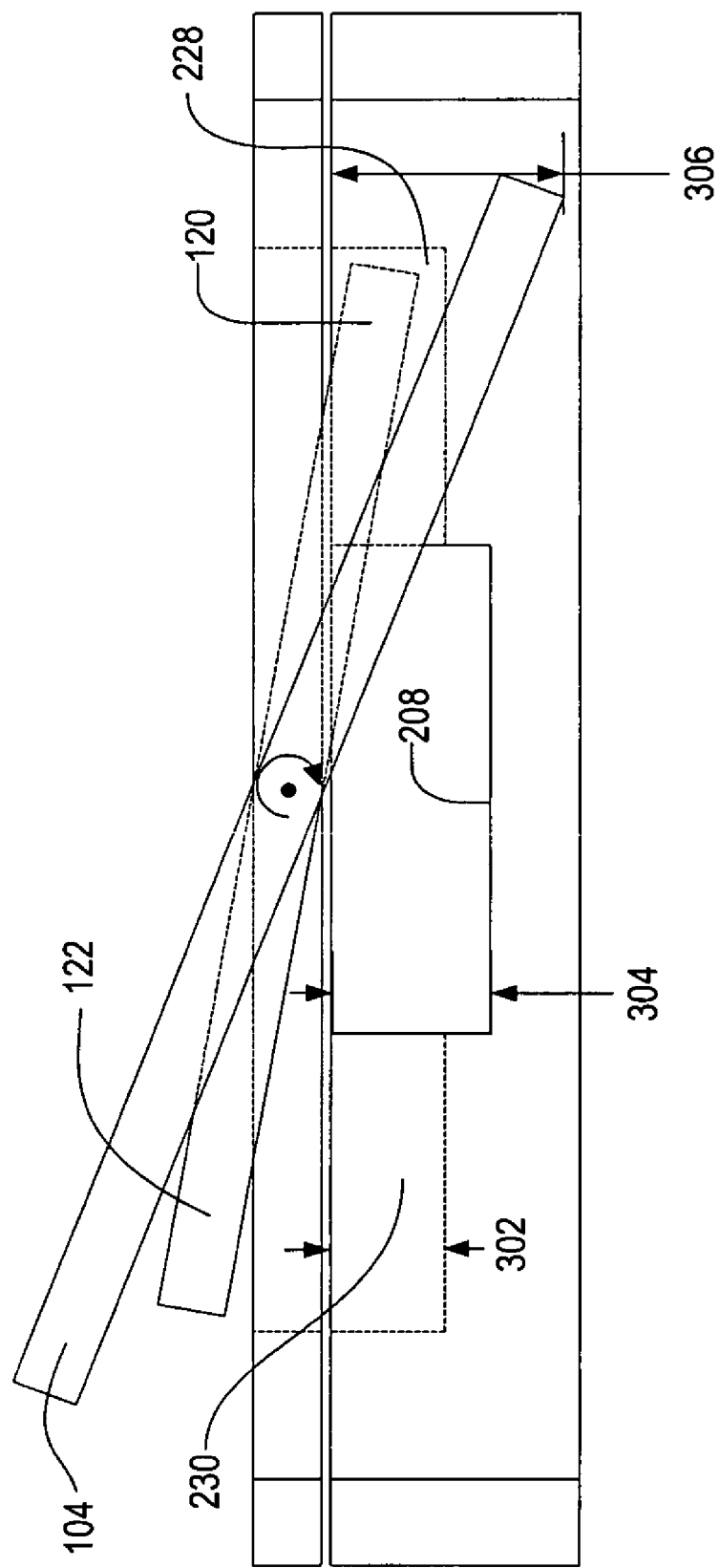
FIG. 4 illustrates a cross-sectional view of the MEMS mirror device of FIG. 1A in one embodiment of the invention.

Stationary comb teeth 228 extend from horizontal section 224 toward rotational axis 110. Stationary comb teeth 228 are staggered to match rotational comb teeth 120. Similarly, stationary comb teeth 230 extend from horizontal section 226 toward rotational axis 110. Stationary comb teeth 230 are also staggered to match rotational comb teeth 122. Stationary comb teeth 228 and rotational comb teeth 120 are interdigitated at least when rotating frame 108 rotates in one direction (e.g., as shown in FIG. 4). Conversely, stationary comb teeth 230 and rotational comb teeth 122 are interdigitated at least when rotating frame 108 rotates in the opposite direction.

Lower layer 202 further includes an optional supporting rib structure 240 onto which mirror 104 (FIG. 2) is mounted. Rib structure 240 includes vertical crossbeams 242 and horizontal crossbeams 244 (only one of each is labeled for clarity). When mounted to rib structure 240, mirror 104 has less dynamic deformation and the optical resolution of device 100 is increased. Rib structure 240 is separated from the remainder of lower layer 202 by a gap 204.

In one embodiment, the components of lower layer 202 are formed by etching a semiconductor wafer so all the appropriate components are structurally supported by a floor 208. The etching process also forms gap 204 around rib structure 240 to accommodate the rotation of mirror 104 (FIG. 2).

FIG. 4 is now used to explain the design benefits of device 100 in one embodiment. Typically stationary comb teeth 228/230, anchoring pad 206 (FIG. 3), anchoring pad 218 (FIG. 3), and gap 204 (FIG. 3) are formed by the same etching step. As the dimensions of stationary comb teeth 228/230 are much smaller than the dimensions of the other components, floor 208 around anchoring pad 218 is etched at a much faster rate than the spacing between stationary comb teeth 228. Thus, the etching process is stopped before floor 208 is etched through and anchoring pad 218 becomes unsupported. However, when the etching process is stopped, the depth 302 of the spacing between stationary comb teeth 228/230 is much shallower than the depth 304 of floor 208. This prevents rotational comb teeth 120/122 from reaching a rotation depth 306 required for some applications of mirror 104. On the other hand, gap 204 is etched through to provide for the angle rotation of the mirror.

To address this challenge, rotating frame 108 (FIG. 2) is torsionally, instead of fixedly, connected to mirror 104 (FIG. 2) by torsional hinge 106 (FIG. 2). As rotating frame 108 rotates, its rotational motion is transferred to mirror 104 by torsional hinge 106. Torsional hinge 106 in turn amplifies the rotational motion so that mirror 104 is rotated at a greater angle. The exact amplification of mirror 104 can be determined by studying the vibration mode shape through computer simulation of device 100. For example, to amplify the rotational amplitude of mirror 104 relative to the rotational amplitude of rotating frame 108, the stiffness of hinge 106 need to be reduced.

Device 100 can be operated in a variety of fashion. In one embodiment, rotational comb teeth 120 and 122 are coupled via bonding pad 114 to receive a reference voltage (e.g., DC). Stationary comb teeth 128 and 130 are coupled via bonding pads 124 and 126, respectively, to receive an oscillating voltage with a steady voltage bias (e.g., an AC+DC voltage). Stationary comb teeth 228 and 230 are coupled via bonding pad 206 to receive an oscillating voltage (e.g., an AC voltage source). The two oscillating voltages have a phase shift of 180 degrees. Thus, a steady (e.g., DC) voltage difference between rotational comb teeth 120/122 and stationary comb teeth 128/130 changes the natural frequency of device 400, whereas oscillating (e.g., AC) voltage differences between rotational comb teeth 120/122 and stationary comb teeth 128/130/228/230 oscillate the mirror at the desired scanning frequency and at the desired scanning angle. The DC voltage difference between rotational comb teeth 120/122 and stationary comb teeth 128/130 is adjusted by adjusting the steady voltage bias of the oscillating voltage provided to stationary comb teeth 128 and 130.

Figure 5:
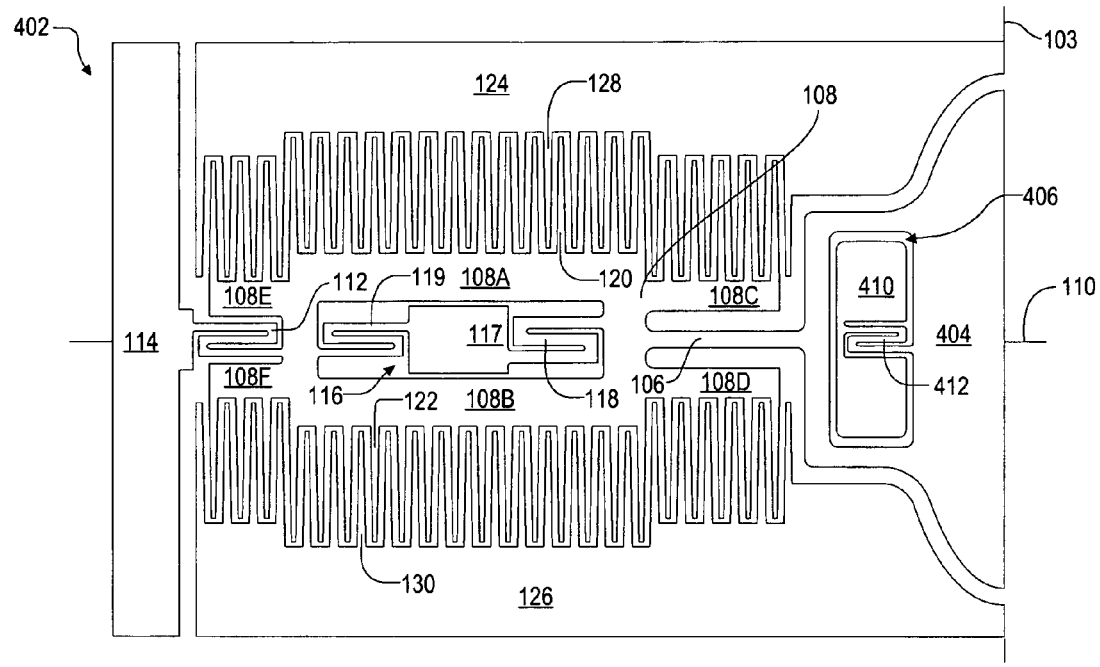
FIGS. 5 and 6 illustrate partial top views of the layers in a MEMS mirror device along a vertical line of symmetry in another embodiment of the invention.
Figure 6:
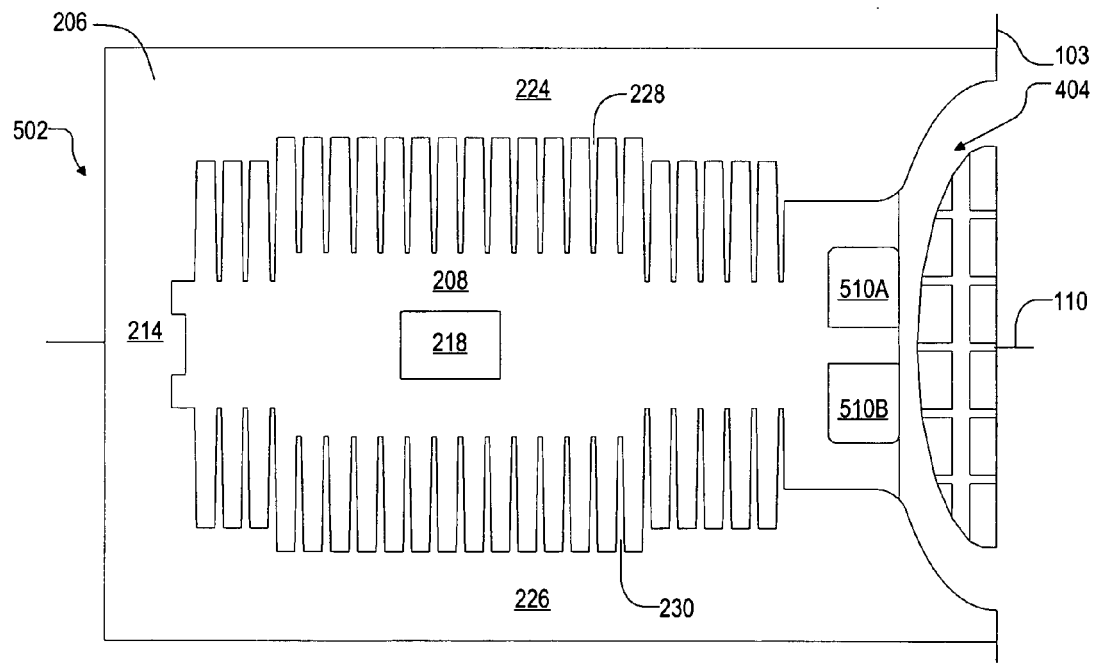

FIGS. 5 and 6 partially illustrate an upper layer 402 and a lower layer 502 of another MEMS mirror device in one embodiment of the invention. This mirror device is similar to mirror device 100 (FIG. 1A) but for the following.

Referring to FIG. 5, layer 402 is similar to layer 102 except that mirror 104 is replaced with a mirror 404. Like mirror 104, mirror 404 is connected by torsional hinge 106 to a first end of rotating frame 108 along rotational axis 110. However, mirror 404 further defines an opening 406 to accommodate a bonding pad 410. Bonding pad 410 is connected by a torsional hinge 412 to mirror 404 along rotational axis 110.

Referring to FIG. 6, layer 502 is similar to layer 202 except that additional anchoring pads 510A and 510B are formed in lower layer 502 to support bonding pad 410.

As described above, mirror 404 is connected by torsional hinge 106 to rotating frame 108 and by torsional hinge 412 to bonding pad 410. The stiffnesses of hinges 106 and 412 are adjusted to control the rotational amplitude of mirror 404. For example, to amplify the rotational amplitude of mirror 404 relative to the rotational amplitude of rotating frame 108, the stiffness of hinge 412 should be reduced and the stiffness of hinge 106 should be made relatively larger. Conversely, to dampen the rotational amplitude of mirror 404 relative to the rotational amplitude of rotating frame 108, the stiffness of hinge 412 should be increased and stiffness of 106 should be made relatively smaller. The exact amplification and dampening rotational amplitude of mirror 404 is also related to the structure inertia distribution and the stiffnesses of the other hinges, which can be determined by studying the vibration mode shape through computer simulation of the device. The device can be operated in the same manner as device 100.

Various other adaptations and combinations of features of the embodiments disclosed are within the scope of the invention. Numerous embodiments are encompassed by the following claims.

What is claimed is:

1. A micro-electro-mechanical system (MEMS) mirror device, comprising:
   a mirror;
   a rotating frame defining a frame opening;
   a plurality of rotational teeth extending from the rotating frame;
   a first torsional hinge coupling the mirror and a first end of the rotating frame along a rotational axis;
   a first bonding pad in the frame opening;
   a second torsional hinge coupling the rotating frame and the first bonding pad along the rotational axis;
   a second bonding pad; and
   a third torsional hinge coupling a second end of the rotating frame and the second bonding pad along the rotational axis.

2. The MEMS mirror device of claim 1, wherein the mirror defines a slot that divides the mirror into a reflector portion and a tab portion coupled by the first torsional hinge to the first end of the rotating frame.

3. The MEMS mirror device of claim 1, further comprising:
   a first anchoring pad onto which the first bonding pad is mounted; and
   a second anchoring pad onto which the second bonding pad is mounted.

4. The MEMS mirror device of claim 1, further comprising:
   a third bonding pad; and a plurality of stationary teeth extending from the third bonding pad to be interdigitated with the plurality of rotational teeth when the rotating frame is in a first position.

5. The MEMS mirror device of claim 4, further comprising:
a first anchoring pad onto which the first bonding pad is mounted;
a second anchoring pad, comprising:
a first section onto which the second bonding pad is mounted;
a second section onto which the third bonding pad is mounted; and
another plurality of stationary teeth extending from the second section to be interdigitated with the plurality of rotational teeth when the rotating frame is in a second position.

6. The MEMS mirror device of claim 5, further comprising:
a supporting structure comprising crossbeams, the mirror being mounted on the supporting structure.

7. The MEMS mirror device of claim 6, wherein:
the mirror, the rotating frame, the first bonding pad, the second bonding pad, the first torsional hinge, the second torsional hinge, the third torsional hinge, the plurality of rotational teeth, and the plurality of stationary teeth are part of a first layer of the device; and
the first anchoring pad, the second anchoring pad, and the supporting structure are part of a second layer of the device onto which the first layer is mounted.

8. The MEMS mirror device of claim 1, wherein the mirror defines a mirror opening, the device further comprising:
a third bonding pad in the mirror opening; and
a fourth torsional hinge coupling the mirror and the third bonding pad along the rotational axis.

9. The MEMS mirror device of claim 8, further comprising:
a first anchoring pad onto which the first bonding pad is mounted;
a second anchoring pad onto which the second bonding pad is mounted; and
a third anchoring pad onto which the third bonding pad is mounted.

10. The MEMS mirror device of claim 9, further comprising:
a fourth bonding pad; and
a plurality of stationary teeth extending from the fourth bonding pad to be interdigitated with the plurality of rotational teeth.

11. The MEMS mirror device of claim 10, further comprising:
a first anchoring pad onto which the first bonding pad is mounted;
a second anchoring pad, comprising:
a first section onto which the second bonding pad is mounted;
a second section onto which the fourth bonding pad is mounted; and
another plurality of stationary teeth extending from the second section to be interdigitated with the plurality of rotational teeth;
a third anchoring pad onto which the third bonding pad is mounted.

12. The MEMS mirror device of claim 11, further comprising:
a supporting structure comprising crossbeams, the mirror being mounted on the supporting structure.

13. The MEMS mirror device of claim 12, wherein:
the mirror, the rotating frame, the first bonding pad, the second bonding pad, the third bonding pad, the fourth bonding pad, the first torsional hinge, the second torsional hinge, the third torsional hinge, the fourth torsional hinge, the plurality of rotational teeth, and the plurality of stationary teeth are part of a first layer of the device; and
the first anchoring pad, the second anchoring pad, the third anchoring pad, the supporting structure, and said another plurality of stationary teeth are part of a second layer of the device onto which the first layer is mounted.

14. A method for operating a micro-electro-mechanical system (MEMS) mirror device, comprising:
coupling a mirror and a rotating frame with a first torsional hinge along a rotational axis;
coupling the rotating frame to a bonding pad with a second torsional hinge along the rotational axis;
providing a first voltage to a plurality of rotational teeth extending from the rotating frame;
providing a second voltage to a plurality of stationary teeth, the plurality of stationary teeth being interdigitated with the plurality of rotational teeth when the rotating frame is in a first position;
wherein:
an oscillating voltage difference between the plurality of rotational teeth and the plurality of stationary teeth oscillates the rotating frame about the rotational axis; and
the first torsional hinge transfers a rotational motion of the rotating frame to the mirror so the mirror rotates at a different angle than the rotating frame.

15. The method of claim 14, wherein the first voltage comprises a steady voltage and the second voltage comprises an oscillating voltage and a steady voltage bias, a steady voltage difference between the plurality of rotational teeth and the plurality of stationary teeth changing a natural frequency of the device.

16. The method of claim 15, further comprising:
providing a third voltage to another plurality of stationary teeth, said another plurality of stationary teeth being interdigitated with the plurality of rotational teeth when the rotating frame is in a second position.

17. The method of claim 16, wherein the third voltage comprises another oscillating voltage out of phase with the second voltage, wherein another oscillating voltage difference between the plurality of rotational teeth and said another plurality of stationary teeth oscillates the rotating frame about the rotational axis.

18. The method of claim 14, further comprising:
coupling the mirror and another bonding pad with a third torsional hinge along a rotational axis.

19. The method of claim 14, further comprising:
supporting the mirror by mounting the mirror onto a structure having crossbeams.

* * * * *